United States Patent
Munch-Fals

(10) Patent No.: US 10,060,455 B2
(45) Date of Patent: Aug. 28, 2018

(54) CLIP FOR A KNOCK-DOWN STRUCTURE

(71) Applicant: Clip-Lok International Limited, Tortola (VG)

(72) Inventor: Jakob Munch-Fals, Gentofte (DK)

(73) Assignee: Clip-Lok International Limited, Tortola (VG)

( * ) Notice: Subject to any disclaimer, the term of this patent is extended or adjusted under 35 U.S.C. 154(b) by 191 days.

(21) Appl. No.: 14/916,408

(22) PCT Filed: Sep. 8, 2014

(86) PCT No.: PCT/IB2014/064313
§ 371 (c)(1),
(2) Date: Mar. 3, 2016

(87) PCT Pub. No.: WO2015/033315
PCT Pub. Date: Mar. 12, 2015

(65) Prior Publication Data
US 2016/0215801 A1    Jul. 28, 2016

(30) Foreign Application Priority Data
Sep. 6, 2013  (ZA) ................................ 2013/06714

(51) Int. Cl.
*F16B 2/24* (2006.01)
*F16B 5/06* (2006.01)
(Continued)

(52) U.S. Cl.
CPC ................ *F16B 2/245* (2013.01); *B65D 9/24* (2013.01); *B65D 11/1873* (2013.01); *F16B 5/0614* (2013.01); *F16B 5/0635* (2013.01)

(58) Field of Classification Search
CPC ........ F16B 5/0614; F16B 5/0607; F16B 5/06; F16B 2005/0678; B65D 9/22; B65D 9/24
See application file for complete search history.

(56) References Cited

U.S. PATENT DOCUMENTS

| 4,024,977 A | 5/1977 | Rowley |
| 4,518,138 A * | 5/1985 | Stutenkemper ........... F16L 3/12 248/220.21 |

(Continued)

FOREIGN PATENT DOCUMENTS

| CH | 327953 | 3/1958 |
| DE | 202010017246 U1 | 6/2011 |

(Continued)

*Primary Examiner* — Jonathan P Masinick
(74) *Attorney, Agent, or Firm* — The Webb Law Firm

(57) ABSTRACT

The invention relates to a releasable clip for use in a knock-down structure, and more particularly but not exclusively, to a releasable plastic clip for use in securing panels of a knock-down structure, for example a collapsible container, to one another. The releasable clip includes two legs that extend away from one another, with the legs being connected at one end, and each leg having an opposite free end that terminates in a panel engagement formation. At least one of the panel engagement formations is an adjustable engagement formation that is adjustable between a locked position, in which the engagement formation is adapted to engage a securing aperture provided in a panel, and a release position, in which the engagement formation is adapted to be released from the securing aperture.

16 Claims, 9 Drawing Sheets

(51) Int. Cl.
 *B65D 6/26* (2006.01)
 *B65D 6/24* (2006.01)

(56) References Cited

U.S. PATENT DOCUMENTS

| | | | |
|---|---|---|---|
| 4,683,622 A | | 8/1987 | Oehlke |
| 5,356,103 A | | 10/1994 | McClurg |
| 5,513,768 A | * | 5/1996 | Smith ............... B01L 3/50825 |
| | | | 215/278 |
| 5,535,909 A | | 7/1996 | Philip |
| 6,389,658 B1 | | 5/2002 | Pfaller et al. |
| 6,443,508 B1 | * | 9/2002 | Persson ............... B65D 9/34 |
| | | | 220/787 |
| 7,387,216 B1 | * | 6/2008 | Smith ............... B01L 3/50825 |
| | | | 215/DIG. 3 |
| 8,813,985 B2 | * | 8/2014 | Schloesser ............... B65D 7/24 |
| | | | 206/600 |
| D732,684 S | * | 6/2015 | Ooi ............................. D24/224 |
| 2003/0102310 A1 | | 6/2003 | Wincent |
| 2004/0208689 A1 | * | 10/2004 | Dijkstra ................ B65D 7/24 |
| | | | 403/256 |
| 2013/0026165 A1 | | 1/2013 | Kvols et al. |
| 2013/0183089 A1 | | 7/2013 | Podsadny et al. |
| 2013/0315652 A1 | * | 11/2013 | Eding ................ B65D 9/24 |
| | | | 403/20 |
| 2016/0258461 A1 | * | 9/2016 | Muller ................ A47D 1/006 |

FOREIGN PATENT DOCUMENTS

| | | |
|---|---|---|
| DE | 102010035012 A1 | 2/2012 |
| EP | 1050940 A1 | 11/2000 |
| FR | 2779123 A1 | 12/1999 |
| WO | 9221574 A1 | 12/1992 |
| WO | 9513969 A1 | 5/1995 |
| WO | 0168459 A1 | 9/2001 |
| WO | WO-0198154 A1 * 12/2001 ............... B65D 9/24 |

\* cited by examiner

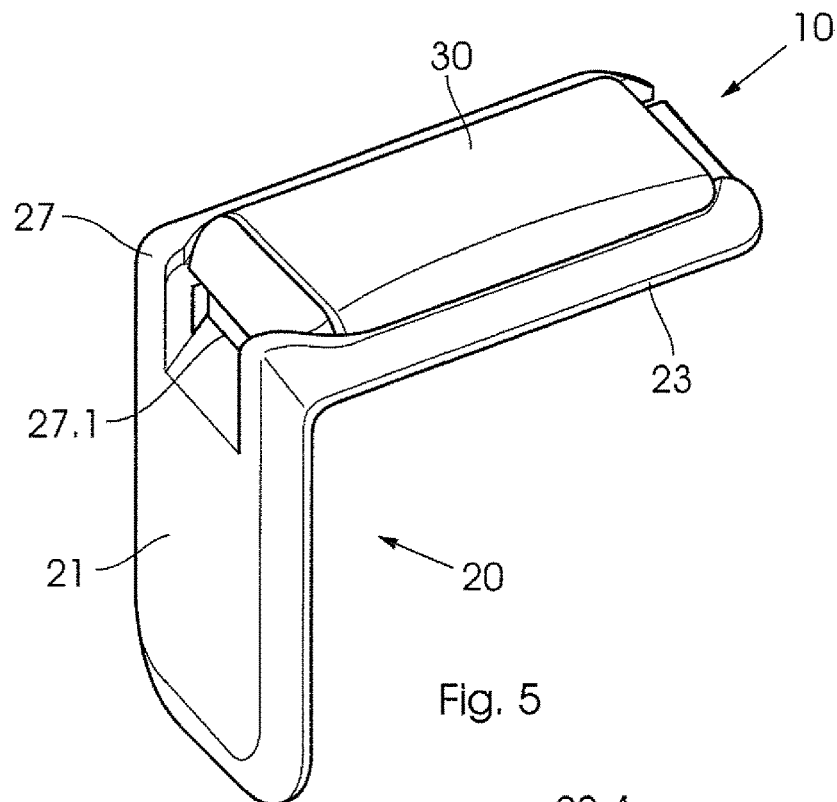
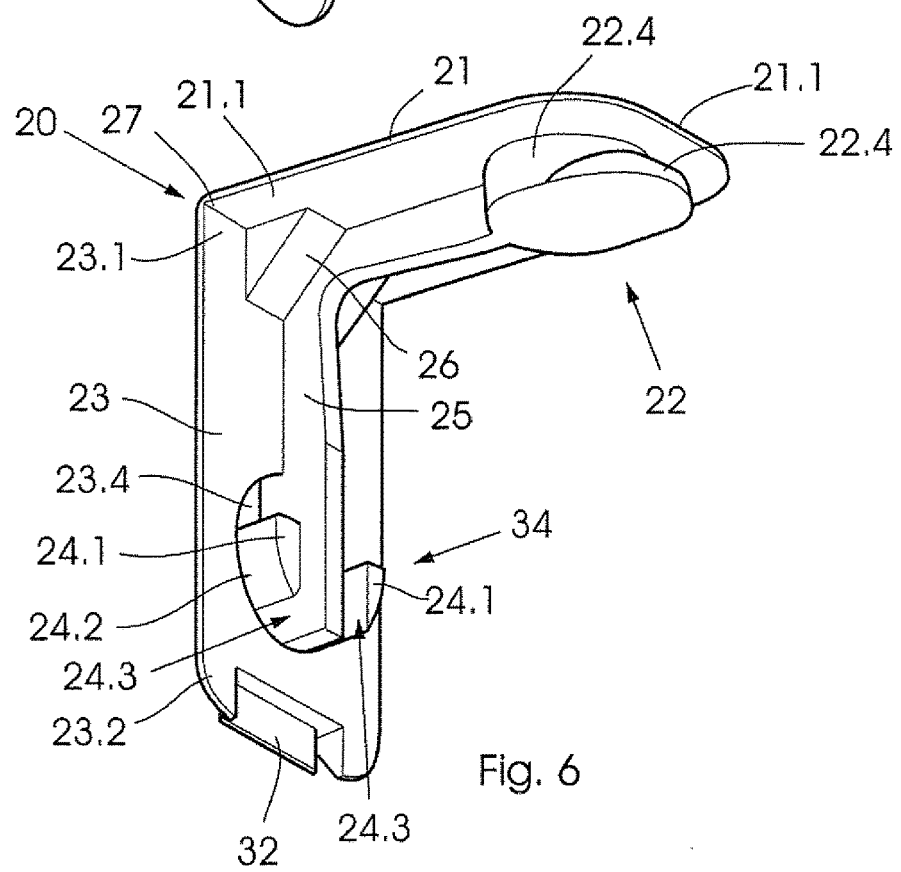

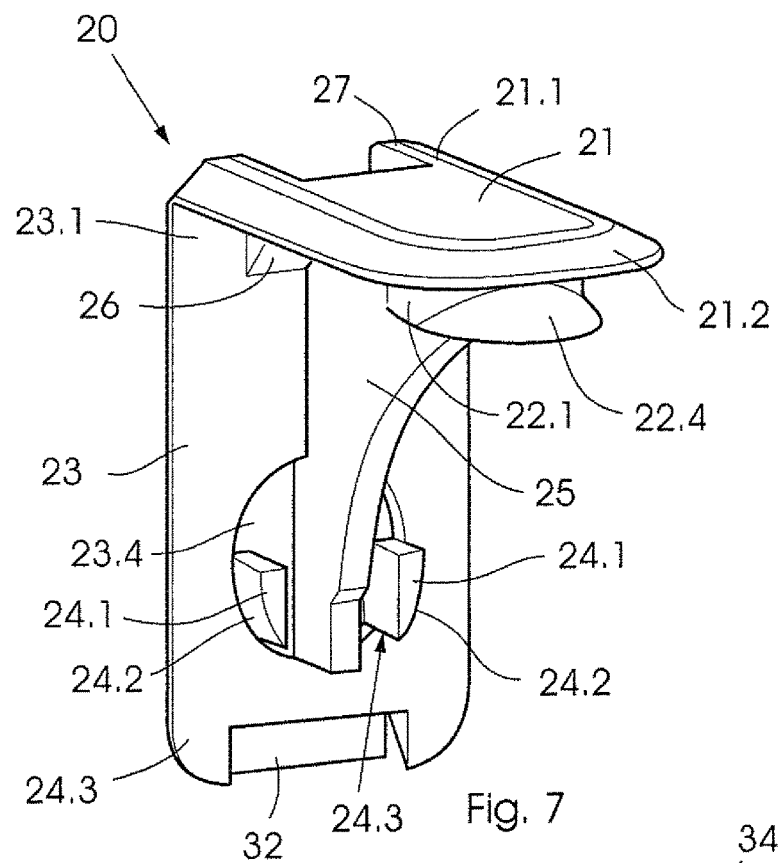
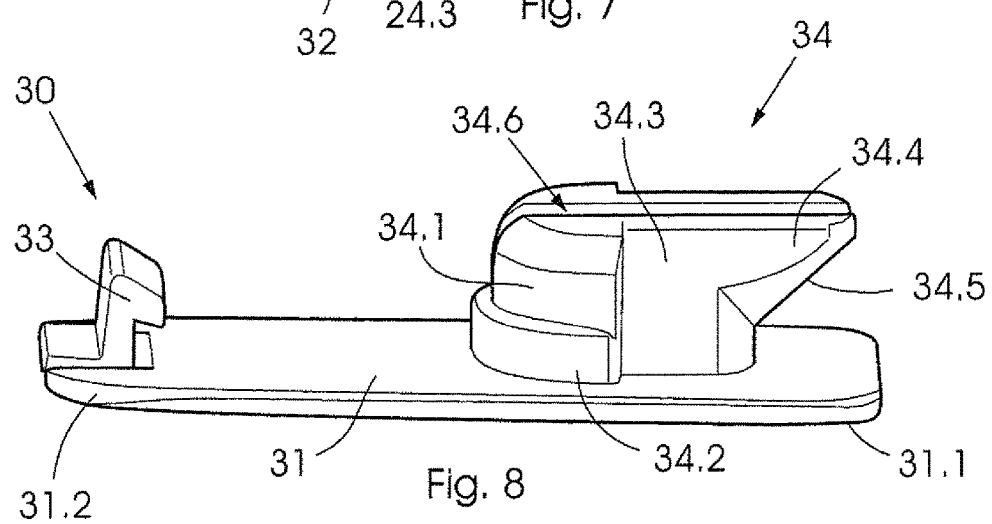

CLIP FOR A KNOCK-DOWN STRUCTURE

CROSS-REFERENCE TO RELATED APPLICATIONS

This application is the United States national phase of International Application No. PCT/IB2014/064313 filed Sep. 8, 2014, and claims priority to South African Patent Application No. 2013/06714 filed Sep. 6, 2013, the disclosures of which are hereby incorporated in their entirety by reference.

BACKGROUND TO THE INVENTION

The invention relates to a clip for use in a knock-down structure, and more particularly but not exclusively, to a releasable plastic clip for use in securing panels of a knock-down structure, for example a collapsible container, to one another.

Containers, such as crates and boxes, (in this specification the terms will be used interchangeably) are widely used for the transportation of goods in many different industries, whilst utilizing many different modes of transportation. When carrying heavy loads, boxes are often made from wood, for example in the form of wooden sheets in the form of planks or plywood panels, which are secured to one another by means of nails, screws and tightening bands so as to form an enclosed volume Most containers are for single use only and are discarded after the transported goods have reached their destination. This procedure is increasingly coming under pressure due to financial, environmental and safety reasons. Disassembly, reuse, removal, destruction and processing of used containers pose a number of risks for users of the containers. People can, for example, be injured in the process of disassembling a box if the box was not designed and constructed with the end goal of easy disassembly kept in mind. The processing of the materials for re-use is also time consuming and expensive, at least in part due to the fact that the constituent parts (i.e. wooden components and steel fasteners) need to be carefully separated as part of the recycling process. Furthermore, in industries where an end user receives a large number of goods and parts from suppliers, and where these products are delivered in plastic, metal or wooden containers, packaging materials can quickly pile up, which significantly increases the cost of handling and storage.

In recent times, the above concerns have led to the development and use of collapsible containers. These containers can easily be erected and assembled to form small or large containers, and this can typically be done by a single person without the use of nails, a hammer or other traditional tools and equipment associated with assembling wooden containers. Many of these wooden containers utilize a system of special clips, in which the clips are adapted securely, but releasably, to secure two adjacent wooden panels to one other. In this way, side walls of the container are connected to one other and to a base using a plurality of clips. A lid is then also securable to an opposing end of the interconnected sidewalls so as to form a complete transportation container which can be handled by a forklift.

In applications where a load to be carried by a container is significant, a clip-assembled container must still be of a design that ensures durability during all normal handling and transportation actions. This means that clips used to assemble the container must be sufficiently strong to withstand both the load carried by the box, as well as additional impact forces exerted on the dips when the box is exposed to external forces, for example when the box bounces, vibrates or are manhandled during loading, transportation and storage. Consequently the most common clips are typically made from high strength steel of 1-2 mm thickness and which are between 20 and 60 mm in width. Often clips are also heat treated to create flexible, strong spring clips.

At present, spring steel that is bent into a desired shape results in the simplest design, and therefore the lowest price in production, as only cutting, bending and surface treatment is necessary. As low complexity ensures correct function over time, producers are reluctant to introduce more complex clips where reliability may potentially be adversely affected by the increased complexity.

In order to maximize the life of these collapsible containers, it is important for the wooden panels to be maintained in a good condition. In particular, it is important for connecting grooves provided in edge zones of the wooden panels to be protected against damage and wear. This can in part be achieved by proper clip design, wherein the design should preferably be such that no sharp edges of the clips engage the grooves provided in the wooden panels when clips are secured to the wooden panels. For this reason, most clips do not have sharp free ends that directly engage the wood, but instead terminate in bent, rounded ends that allow the clip to slide safely and with reduced friction over the fragile wooden surface and locking edges without sacrificing too much clamping force. A clip of this design is shown in FIGS. 1 and 2, which illustrates a clip 100 comprising a sheet of metal having been bent at a right angle in order to define two opposing legs (101 and 102). Each leg terminates in a rounded end 103 which in use engages slots 104 provided in a wooden panel 105.

When assembled, the clips are exposed to various forces, including bending moments induced by the relative angular displacement between adjoining panels, and also shear forces resulting from relative transverse displacement of adjoining panels. This is not limited to gradual and constant loading, and additional impact loads may be exerted on the clips during handling and transportation of the box, where the box and content are subjected to impacts, shocks and vibration. The clips therefore have to be very strong, and have to exert a significant clamping force on the adjoining panels. It follows that the ends of the clips must securely engage the grooves provided in the panels.

Steel clips generally work well, but suffer from a number of disadvantages including the cost of manufacturing the clips, corrosions (in particular stress corrosion cracking), and also the weight of the steel clips. It would therefore be beneficial to develop a synthetic clip, or a clip made from recycled material, to use as an alternative or replacement to traditional steel clips. It should, however be noted that existing steel clipping systems are based on the principle of resilient clips that grip end zones of adjacent panels around a corner formed by such panels, with slots provided in the edge zones of such panels for receiving the ends of the clips. However, plastic (or another suitable synthetic or recycled material) does not exhibit a long terms spring effect, and will accordingly relax and prolong over time if continuously exposed to stress. The same design criteria used when designing steel clips can therefore not simply be applied to the design and manufacture of plastic clips, which is also a reason why there has not been much development in this area.

It is accordingly an object of the invention to provide a clip for a knock-down structure, for example a collapsible container that will, at least partially, alleviate the above disadvantages.

It is also an object of the invention to provide a plastic clip for a knock-down structure, for example a collapsible container, which will be a useful alternative to existing releasable steel clips.

SUMMARY OF THE INVENTION

According to the invention there is provided a releasable clip suitable for securing two panels of a knock-down structure to one another, the releasable clip including:

two legs extending away from one another,
the legs being connected at one end, with each leg having an opposite free end that terminates in a panel engagement formation;
characterized in that at least one of the panel engagement formations is an adjustable engagement formation that is adjustable between a locked position, in which the engagement formation is adapted to engage a securing aperture provided in a panel, and a release position, in which the engagement formation is adapted to be released from the securing aperture.

There is provided for a supporting gusset to extend between the two legs.

Preferably, the supporting gusset is orientated in a plane perpendicularly relative to the legs.

One or more auxiliary connecting apertures may be provided in, and may extend through, the supporting gusset.

There is provided for the clip to be made of a plastic material,

There is provided for the adjustable engagement formation to include a stationary section which is stationary relative to the leg with which it is associated, and a displaceable section, which is displaceable relative to the leg with which it is associated.

Preferably the stationary section will be spaced apart from the displaceable section when the engagement formation is in the release position.

Preferably the stationary section and the displaceable section will be juxtaposed when the engagement formation is in a locked position.

There is provided for the stationary section and the displaceable section to be complementary configured in order to fit into one another, so as to form a singular, merged engagement formation when the displaceable section is in the locked position.

The stationary section may protrude from the leg with which it is associated, and is preferably integrally formed with such leg.

The displaceable section may extend from a locking arm, with the locking arm being displaceable relative to the leg.

There is provided for the locking arm to be pivotably displaceable relative to the leg.

The locking arm may be hingedly connected to the leg.

In a preferred embodiment the locking arm will be hingedly displaceable between an open position, in which the arm is spaced apart from the leg, and in which the displaceable section of the engagement formation is spaced apart from the stationary section of the engagement formation; and
a locked position, in which the arm overlies the leg, and in which the displaceable section of the engagement formation cooperates with the stationary section of the engagement formation so as to form a composite engagement formation that is configured and dimensioned to engage the aperture provided in the panel to be secured.

There is provided for the arm to be releasably lockable in the locked position.

Preferably, the arm is releasably lockable in the locked position by way of a resilient hook and catch configuration. The resilient hook may be provided on an end of the arm, and the catch may be provided on the leg to which the locking arm is secured, or alternatively on a corner zone that is defined by the joint between the two legs.

The clip may include a tamper proof device in the form of a locking member that prevents the locking arm from being displaced to the release position without the irreversible removal of the tamper proof device.

The stationary section of the adjustable engagement formation may be in the form of two spaced apart protrusions, with a gap being formed between the two spaced apart protrusions.

Outer perimeters of the spaced apart protrusions may follow a part of the profile of the aperture in the panel to be secured by the clip.

The displaceable section of the adjustable engagement formation may include a primary body configured and dimensioned to fit inside the securing aperture in the panel to be secured.

Preferably, the displaceable section also includes a lateral extension extending sideways from the body, the lateral extension being configured and dimensioned suitable for, in use, engaging a recessed retaining zone of the securing aperture in the panel.

An end of the lateral extension may extend beyond a periphery of the protrusions defining the stationary engagement formation when the adjustable engagement formation is in the locked position.

There is provided for the lateral extension to be of tapered configuration, and more particularly for the lateral extension to be substantially triangular when viewed in cross-section, with a base of the lateral extension being co-planar with a base of the body of the displaceable section.

There is also provided for the body of the displaceable section of the adjustable engagement formation to include a stepped zone having a cross-sectional span that is larger than the cross-sectional span of the remainder of the body, The stepped zone is located immediately adjacent the leg from which the body of the stationary engagement formation extends.

A connecting zone may be provided between the body and the lateral extension, and will in use fit in the gap between the opposing protrusions of the stationary section of the adjustable engagement formation.

An elongate slot may furthermore extend through the displaceable section (through the body, connecting zone and the lateral extension), and may be configured and dimensioned to receive the gusset therein when the displaceable section of the adjustable engagement formation is in a locked position.

There is provided for the other engagement formation to be a fixed engagement formation.

The fixed engagement formation may include a body configured and dimensioned to fit inside the securing aperture in the panel to be secured.

The fixed engagement formation may include a lateral extension extending sideways from the body, with the lateral extension being configured and dimensioned to engage a recessed zone of the securing aperture in the panel.

An end of the lateral extension may extend beyond a periphery body of the fixed engagement formation.

There is provided for the lateral extension to be of a tapered configuration, and more particularly for the lateral extension to be substantially triangular when viewed in cross-section, with a base of the lateral extension being co-planar with a base of the body of the fixed engagement formation.

There is also provided for the body of the engagement formation to include a stepped zone having a cross-sectional span that is larger than the cross-sectional span of the rest of the body.

The stepped zone is located immediately adjacent the leg from which the body of the stationary engagement formation extends.

The knock-down structure may be a collapsible container.

According to a further aspect of the invention there is provided a panel, suitable for use as a sidewall of a knock-down structure, for example a collapsible container, the panel including a securing aperture provided in an edge zone thereof, and a slot that extends from the securing aperture to an edge of the panel.

There is provided for at least part of the securing aperture to be in the form of a cylindrical hole extending through the panel.

There is provided for the securing aperture to have an operatively outer opening and an operatively inner opening, with the operatively outer opening being larger than the operatively inner opening.

The securing aperture may include at least one edge section which is angularly offset relative to an axis extending perpendicularly from an upper surface of the panel in order for at least part of the securing aperture to be outwardly tapering from an outside of the panel towards an inside of the panel.

According to a still further feature of the invention there is provided a knock-down structure including:
  at least two panels located adjacent one another, each panel including:
    a securing aperture provided in an edge zone thereof, and
    a slot that extends from the aperture to an edge of the panel;
  a clip comprising:
    two legs extending away from one another,
    the legs being connected at one end, with each leg having a free end that terminates in a panel engagement formation;
    characterized in that at least one of the engagement formations is an adjustable engagement formation that is adjustable between a locked position, in which the engagement formation is adapted to engage the securing aperture provided in a panel, and a release position, in which the engagement formation is released from the securing aperture.

There is provided for the knock-down structure to be a collapsible container, and for the panels of the knock-down structure to form walls of the container.

According to a still further aspect of the invention there is provided a method of assembling a knock-down structure, the method including the steps of:
  providing at least two panels located adjacent one another, each panel comprising a securing aperture provided in an edge zone thereof, and a slot that extends from the aperture to an edge of the panel;
  providing a clip comprising two legs extending away from one another, the legs being connected at one end, with each leg having a free end that terminates in a panel engagement formation;
  wherein at least one of the engagement formations is an adjustable engagement formation that is adjustable between a locked position, in which the engagement formation is adapted to engage the securing aperture provided in a panel, and a release position, in which the engagement formation is released from the securing aperture;
  locating a fixed engagement formation of the clip into a securing aperture of one of the panels;
  locating the adjustable engagement formation of the clip into a securing aperture of an adjacent panel while the adjustable engagement formation is in a release position; and
  displacing the adjustable engagement formation from the release position to the locked position in order to secure the clip to the panels.

There is provided for the knock-down structure to be a collapsible container, and for the panels of the knock-down structure to form walls of the container.

BRIEF DESCRIPTION OF THE DRAWINGS

A preferred embodiment of the invention is described by way of non-limiting examples, and with reference to the accompanying drawings in which:

FIG. 5 is a perspective view of the clip of FIG. 3 in a locked position;

FIG. 6 is a perspective view of one embodiment of a body of the clip of FIG. 3;

FIG. 7 is a perspective view of another embodiment of the body of the clip of FIG. 3;

FIG. 8 is a bottom perspective view of a locking arm of the clip of FIG. 3;

DETAILED DESCRIPTION OF INVENTION

Figure 1:
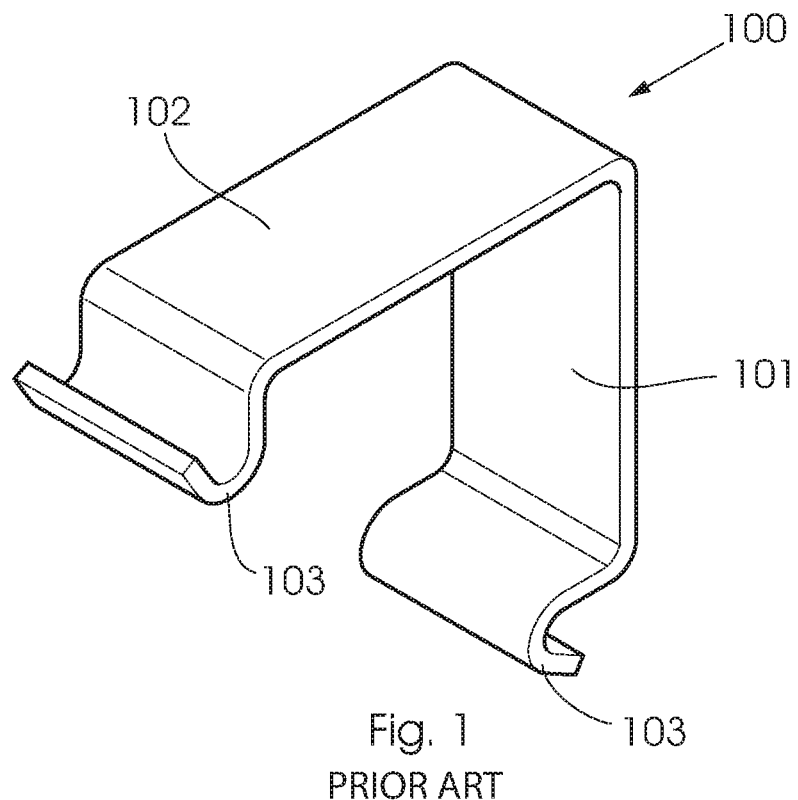
FIG. 1 is a perspective view of a prior art clip.
Figure 2:
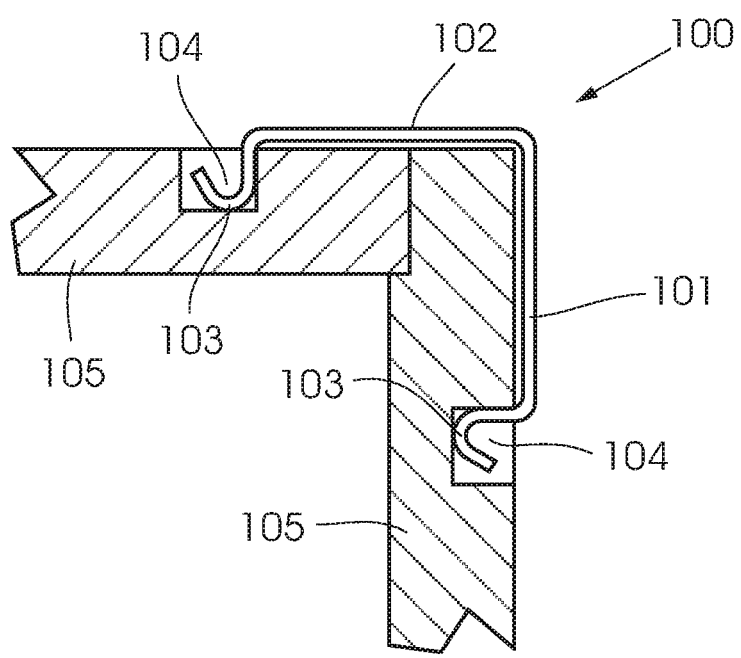
FIG. 2 is a cross-sectional side view of the clip of FIG. 1 in use.
Figure 3:
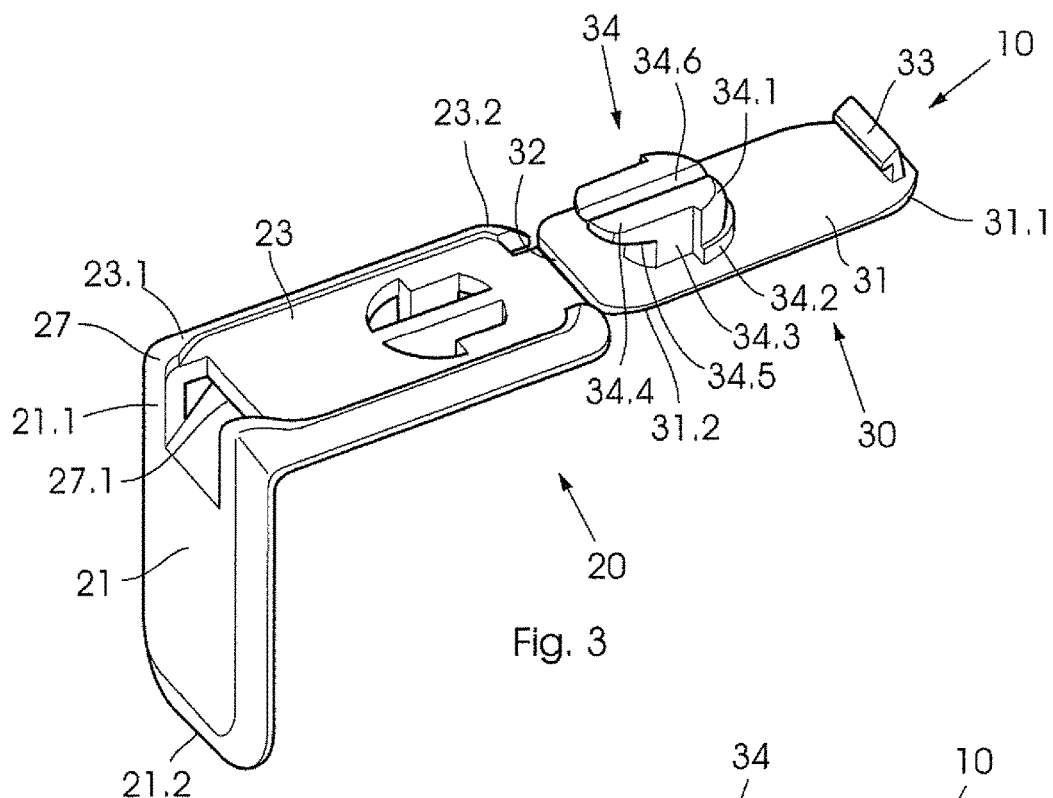
FIG. 3 is a perspective view of a clip in accordance with one embodiment of the invention, showing the clip in a release position.
Figure 4:
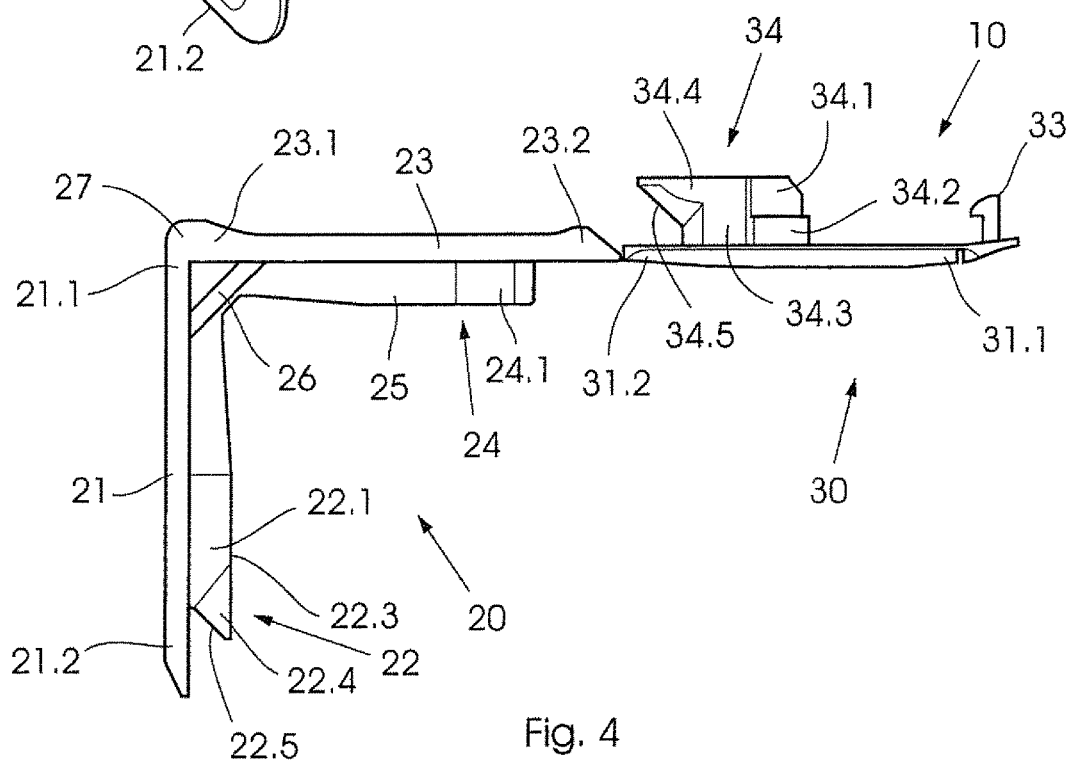
FIG. 4 is a side view of the clip of FIG. 3.
Figure 9:
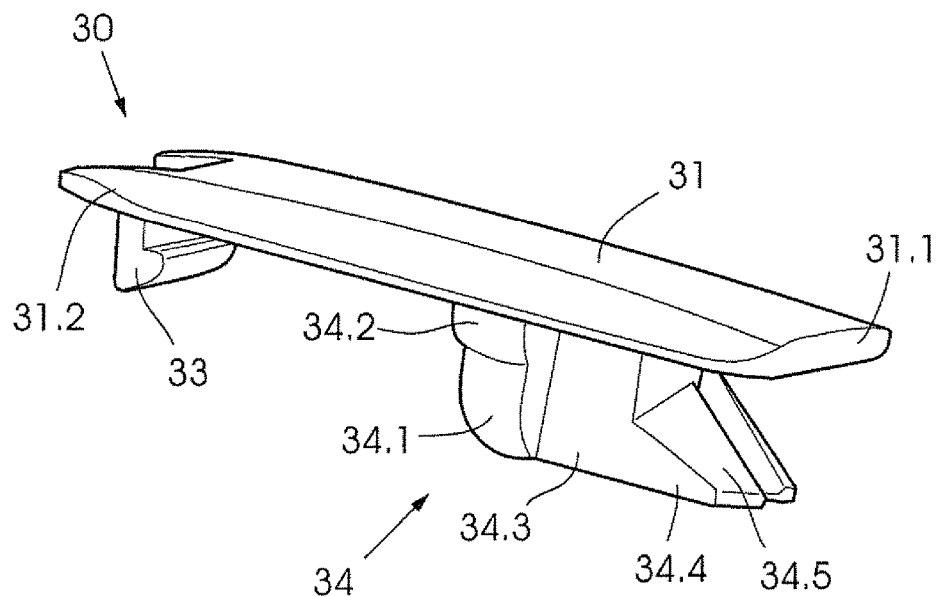
FIG. 9 is a top perspective view of the locking arm of FIG. 8.

Referring to FIGS. 3 to 10, in which like numerals indicate like features, a non-limiting example of a releasable clip for a collapsible container in accordance with the invention is generally indicated by reference numeral 10.

The clip 10 is used releasably to secure adjacent panels 11 of a collapsible panel to one another. The clip 10 is new and inventive in that is made from a plastic material, which necessitated a number of novel and inventive design changes over the resilient steel clips that are commonly found in the art. One important deviation of the new design over traditional clip design is that the clip must define a geometric lock because of the lack of resilience of the plastic material from which the clip is made. The clip body is essentially rigid, and one can neither rely on the natural resilience of the clip body to install the clip, nor to achieve a required clamping force. The challenge is therefore to find an adequate way in which to make a clip that will facilitate geometric locking, whilst still being sufficiently robust to survive harsh treatment and conditions. The change from a resilient material, such as spring steel, to a more rigid material, such as plastic, is therefore far removed from a mere material change, and many new design considerations have to be taken into account.

The clip 10 is used together with customized wall panels 11, with each wall panel including at least one (depending on the number of clips used) securing aperture 12 provided in an edge zone the wall panel 11. More particularly, aligned securing apertures 11 are provided in adjacent wall panels 11 that have been positioned in a configuration in which the panels are to be secured to one another. Each securing aperture 12 includes a cylindrical hole 12.1, with a slot 13 extending from an edge of the cylindrical hole to an edge of the wall panel 11 for reasons that will become apparent hereinbelow. In a preferred embodiment, there is also provided for one side of the cylindrical hole 12.1 to end in a tapered retaining recess 12.2 having a tapered side surface. The implication of this is that the securing aperture 12 will then have an outer opening which is smaller than an inner opening of the securing aperture, which paves the way for a securing means to be trapped inside the securing aperture, with the securing means having a span that is larger than the span of the outer opening of the securing aperture. A rebate 14, for receiving reinforcing formations 26 provided on the clip 10, is provided in an edge of the panel 11, and corresponds with the slot 13 extending from the securing aperture 12 to the edge of the panel.

In the embodiments shown in the figures, the clip 10 comprises an integrally formed plastic body 20. The body 20 includes a first leg 21 and a second leg 23, which are substantially perpendicular relative to one another, and which are connected at one another at a corner zone 27 of the clip 10. Both the legs (21 and 23) are of a planar, sheet-like construction, and the two legs are furthermore linked to one another by way of a reinforcement gusset 25 that extend between the two legs. The reinforcement gusset is also of a planar, sheet-like construction, but is orientated in a plane perpendicularly to the two legs. The shape and configuration of the gusset may vary, and two embodiments are shown in FIGS. 6 and 7. In the embodiment shown in FIG. 6, the size of the gusset has been minimized in order to reduce the degree to which the clip (or parts thereof) extends into the collapsible container. In the embodiment shown in FIG. 7 the gusset is of larger surface area, and will therefore be more rigid. In addition, it will be possible to provide at least one aperture (not shown) in the gusset, which can then be used as an anchor for securing items inside the container. The downside of this configuration is of course that the gusset will extend further into the enclosed volume of the collapsible container, in so doing reducing the effective enclosed volume of the container. Additional reinforcement formations 26 extend between the legs (21 and 23), and are located on opposite sides of the gusset 25. The gusset is an important addition to the new clip design, as it will counteract shearing forces to which the clip will be exposed during use. The gussets will prevent any relative lateral displacement between two adjacent panels, and the panels will therefore not be able to accelerate relative to one another, which will prevent the occurrence of high impact forces that are exerted on the clip.

In the embodiments shown in the figures, the legs and the gusset are all integrally formed from a plastic material during a molding process, but it is conceivable that the legs and the gussets may be separate elements that are secured to one another once manufactured.

The first leg 21 of the clip body 20 comprises a connected end 21.1, which terminates in the corner zone 27 of the clip 10, and an opposing free end 21.2. A first, fixed engagement formation 22 extends from the first leg 21, and is located towards the free end 21.2 of the first leg 21. The first, fixed engagement formation 22 includes an at least partially cylindrical body 22.1 that extends substantially perpendicularly from the first leg 21. Although not shown in the particular embodiment, the cylindrical body 22.1 may include a stepped zone (not shown) that has a diameter larger than the remainder of the body 22.1. The stepped zone will then be the part that in use engages the edges of the securing aperture 12 in the panel, and the adjacent, operatively inner, reduced diameter section will be provided to enable the first, fixed engagement formation to be inserted into the securing aperture at an angle, which is required due to the presence of the lateral extension 22.4 described below. If the cylindrical body 22.1 is of a uniform diameter, it may be difficult to install the first, fixed engagement formation inside the securing aperture 12 in the configuration where the lateral extension 22.4 is present, or extends too far from the cylindrical body 22.1. If the diameter of the entire cylindrical body is then reduced, no part of the cylindrical body will fit snugly inside the securing aperture 12, and the panel will be able to be slideably displaced relative to the engagement formation 22. If the lateral extension 22.4 is not present, the entire cylindrical body 22.1 can, however, be of the same diameter and more particularly the diameter equal to or slightly smaller than the diameter of the securing aperture 12.

In some embodiments the clip 10 will be used without the lateral extensions 22.4 referred to above. However, in embodiments where enhanced engagement is required the lateral extensions 22.4 will be provided, and will act as engagement teeth that engage the retaining recess 12.2 forming part of the securing aperture 12. The lateral extensions 22.4 will prevent the engagement formation 22 from being displaced perpendicularly relative to the panel 11 to which the clip is secured, which will in particular be beneficial during erection of the collapsible container, where angular displacement of the panels relative to one another can still occur. The lateral extension 22.4 may take many different forms, provided that an end of the lateral extension protrudes beyond the periphery of the cylindrical body 22.1 of the first, fixed engagement formation 22. It follows that the retaining recess 12.2 provided in the panel 11 will have a shape and configuration complementary to that of the lateral extension 22.4, and that it would include at least some sort of lip formation behind which at least part of the lateral extension 22.4 will be trapped in use. In this particular embodiment, the lateral extension 22.4 is at least partially conical, and includes a tapering upper surface 22.5 that matches the upper surface of the tapered recess 12.2 in the panel 11. The lateral extension 22.4 is therefore triangular when viewed in cross-section, and a base of the lateral extension is co-planar with an end of the cylindrical body 22.1.

The gusset 25 extends from one end of the cylindrical body 22.1 towards the corner zone 27 of the clip body 20.

The second leg 23 of the clip body 20 comprises a connected end 23.1, which terminates in the corner zone 27 of the clip 10, and an opposing free end 23.2. A second, adjustable engagement formation 24 is provided on, or associated with, the second leg 24. In this embodiment, the second, adjustable engagement formation 24 is not a singular, integrally formed formation, but rather comprises at least two sections that are displaceable relative to one another so as to define a composite engagement formation. It is foreseen that the second adjustable engagement formation may comprise a single formation, for example a rotatable off-centered cam, but in that case the engagement formation will still be displaceable between a locked and a released position, and will still not be a fixed, stationary engagement formation.

In this embodiment, the second engagement formation 24 includes a stationary section 24.1 that extends from the second leg 23 of the body 20, and a displaceable section 34 that extends from a locking arm 30 which is pivotably secured to the body 20 as is described in more detail below. The stationary section is in the form of two opposing protrusions 24.1 that protrude substantially perpendicularly from the second leg 23. Each protrusion is approximately shaped like a quarter of a circle, and the two protrusions are spaced apart in order to form a gap 24.3 therebetween. In use, the gap 24 will receive the displaceable section 34 of the second engagement formation 24 when the second engagement formation 24 is configured to be in a locked position. An arcuate outer surface 24.2 of each of the protrusions 24.1 is configured and dimensioned to be complementary profiled to the securing aperture 12, and in particular one end of the cylindrical hole 12.1, in order snugly to fit inside the securing aperture when the clip being installed on a panel 11 forming part of a collapsible container.

A locking arm 30 is pivotably secured to the second leg 23 of the body 20, and in particular is secured to the second leg 23 by way of a hinge 32. The locking arm 30 is therefore displaceable between a locked position in which the locking arm overlies the second leg 23, and a release position in which the locking arm 30 is spaced apart, and angularly displaced from, the second leg 23. The locking arm 30 can be secured in the locked position by way of a hook formation 33 that can releasably engage the catch formation 27.1 provided on the corner zone 27 of the body 20 of the clip 10. In addition, a tamper proof locking member 40 is securable to the corner zone 27 and will prevent the locking arm 30, and in particular the hook formation 33, from being displaced when the tamperproof locking member 40 is secured to the body 20. The tamperproof locking member 40 will at least partially be destroyed when it is removed from the body 20, and it will not be possible to replace the tamper-proof locking member 40 without noticing that the tamper-proof locking member 40 has previously been removed. In this way it will not be possible to open the clip 10 without a leading tell-tale indication that the clip was opened.

The locking arm comprises an elongate body 31 which is of a planar, sheet-like configuration, and which includes a first end 31.1 that terminates in a hinge formation 32 and a second free end 31.2. The hook formation 33 is provided towards the end of the second end 31.2. The displaceable section 34 of the second engagement formation 24 extends from the locking arm 30. The displaceable section 34 is configured and dimensioned to cooperate with the stationary section 24.1 of the second engagement formation 24 in order for the displaceable section 34 and the displaceable section 24.1 to form an interlocked engagement formation when in the locked position. The displaceable section 34 includes a body 34.1 which is of a partially cylindrical configuration, and more particularly is semicircular when viewed in plan. This part of the displaceable section 34 will be positioned adjacent the two opposing protrusions 24.1 of the stationary section when the second engagement formation 24 is in a locked configuration. The body 34.1 of the displaceable section 34 and the opposing protrusions 24.1 of the stationary section will therefore form a substantially cylindrical protrusion when the second engagement formation 24 is in a locked position, which protrusion will fit into the securing aperture 12 that is provided in the panel to be secured. The body 34.1 of the displaceable section 34 also includes a stepped zone 34.2, which is similar in nature to the stepped zone 22.2 of the first engagement formation 22. A connecting zone 34.3 extends from the body 34.1 of the displaceable section 34 and is configured and dimensioned to fit inside the gap 24.3 provided between the opposing protrusions 24.1 defining the stationary section of the second engagement formation 24. Finally, the lateral extension 34.4 extends from the connecting zone 34.3, with an extremity of the lateral extension 34.4 extending beyond a circular profile defined by the body 34.1 of the displaceable section and the opposing protrusions 24.1 of the stationary section when in the locked position. The lateral extension 34.4 is similar in configuration and purpose to the lateral extension 22.4 of the first engagement formation 22, and will therefore not be described in detail because the same principle applies as set out above. Suffice it to say that the lateral extension 34.4 also includes a tapering surface 34.5 which again is complementary to the tapered the recess 12.2 that forms part of securing aperture 12 provided in the panel 11. A longitudinal slot 34.6 extends through the body 34.1, the connecting zone 34.3 and the lateral extension 34.4 of the displaceable section 34, and in use receives the gusset 25 when the locking arm 30, and hence the second engagement formation 24, is displaced to the locked position.

Figure 10:
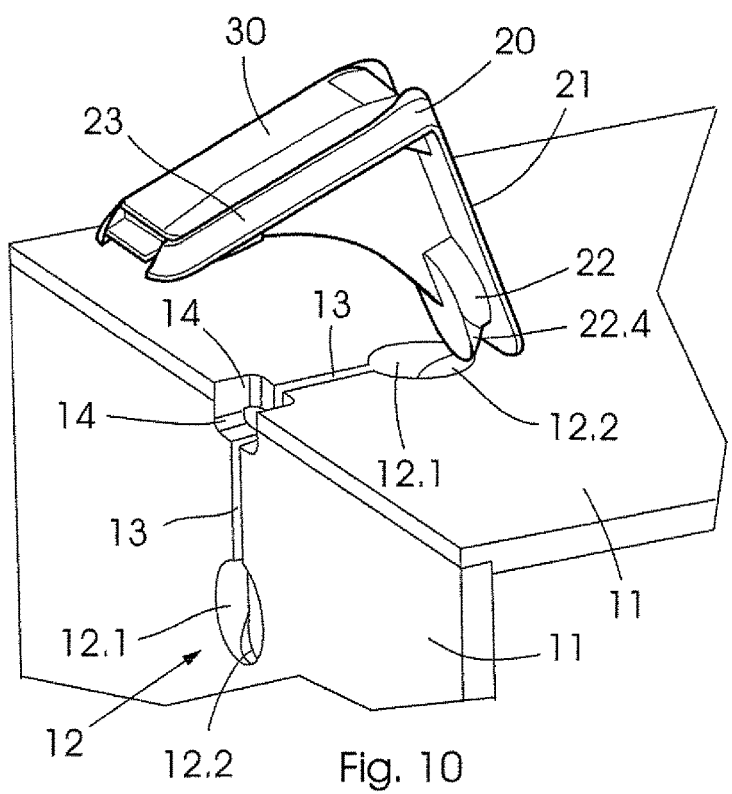
FIG. 10 shows the clip of FIG. 3 prior to engaging adjacent wall panels of a collapsible container.
Figure 11:
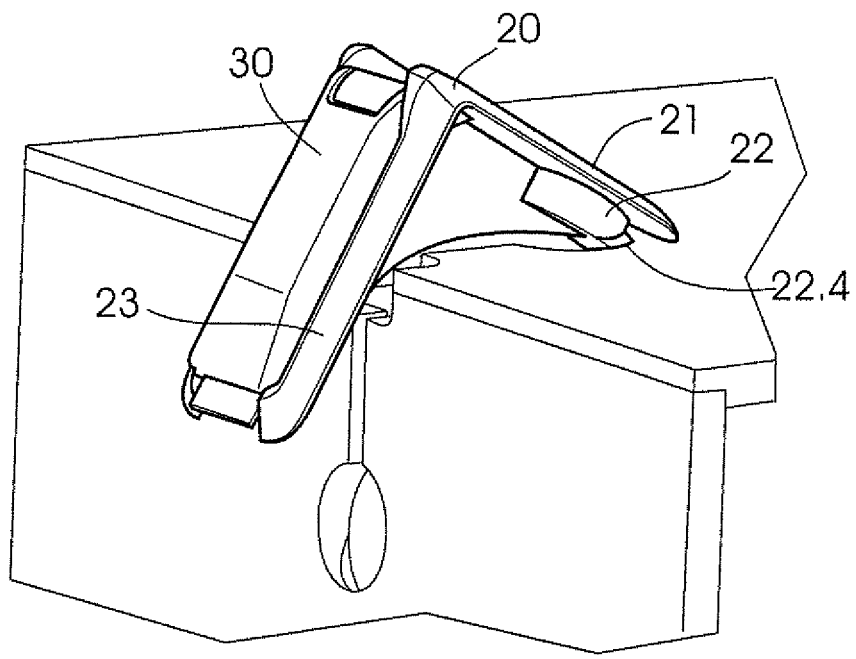
FIG. 11 shows the clip of FIG. 10 with a fixed engagement formation of the clip being partially inserted into a securing aperture provided in one of the panels.
Figure 12:
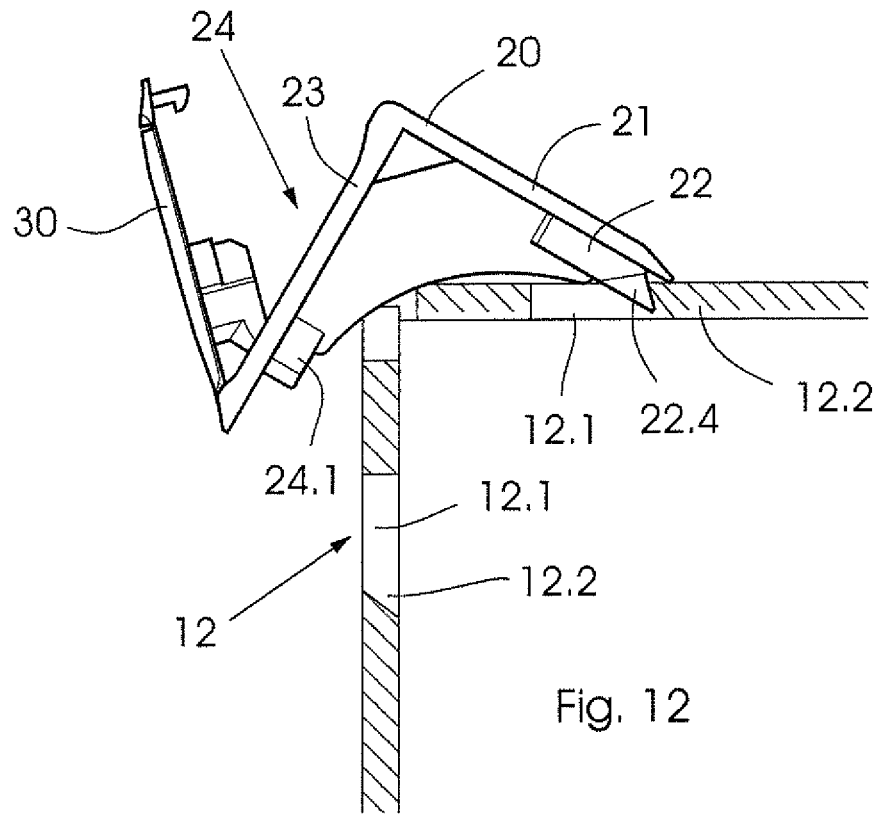
FIG. 12 is a side view of the clip and panel combination of FIG. 11.
Figure 13:
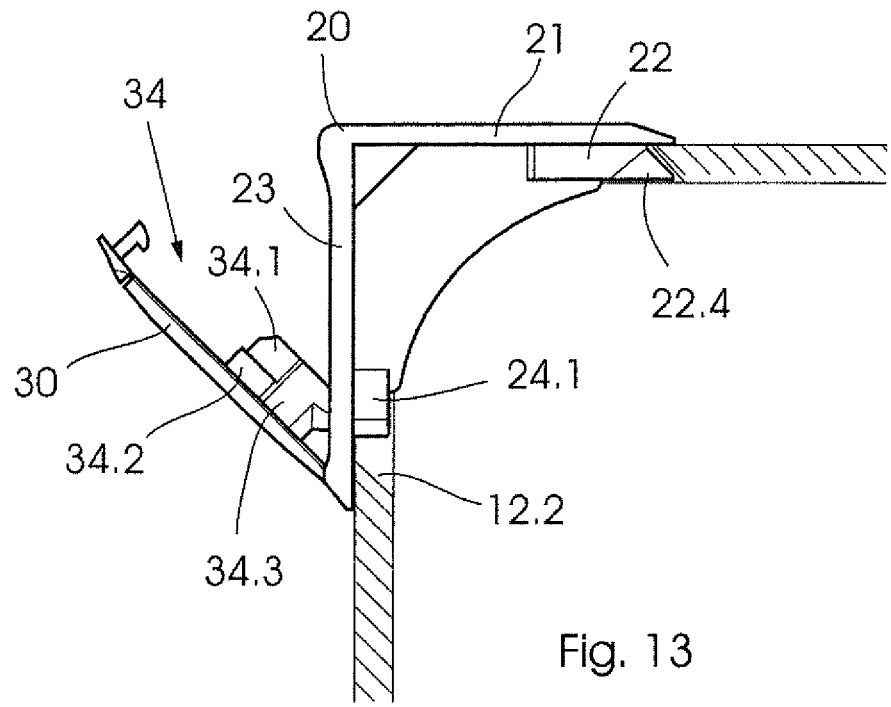
FIG. 13 is a side view of the clip and panel combination, in which the adjustable engagement formation is in the process of engaging a securing aperture in another panel, with the locking arm still in a release position.
Figure 14:
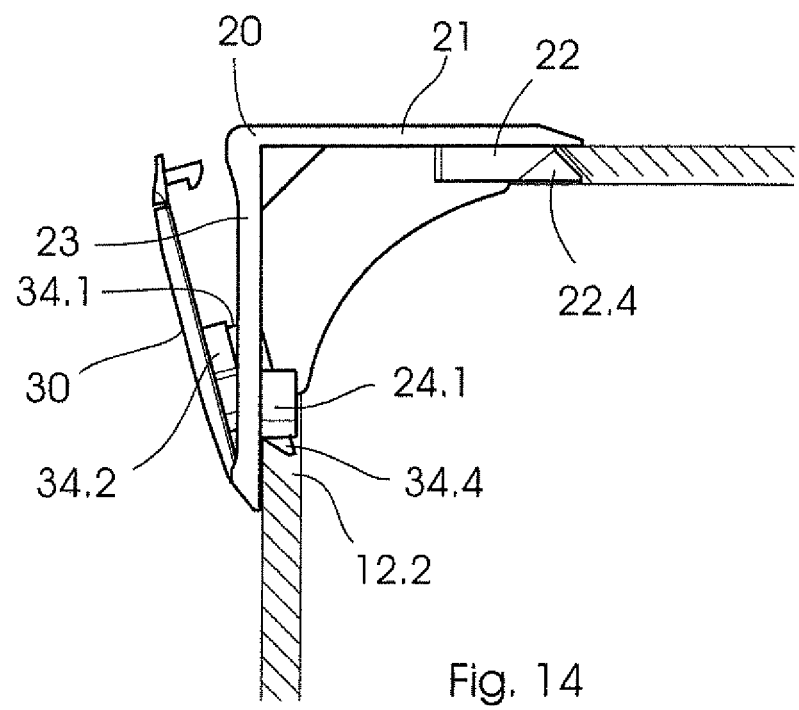
FIG. 14 shows the clip and panel combination of FIG. 13 in which the locking arm is partially displaced towards the locking position.
Figure 15:
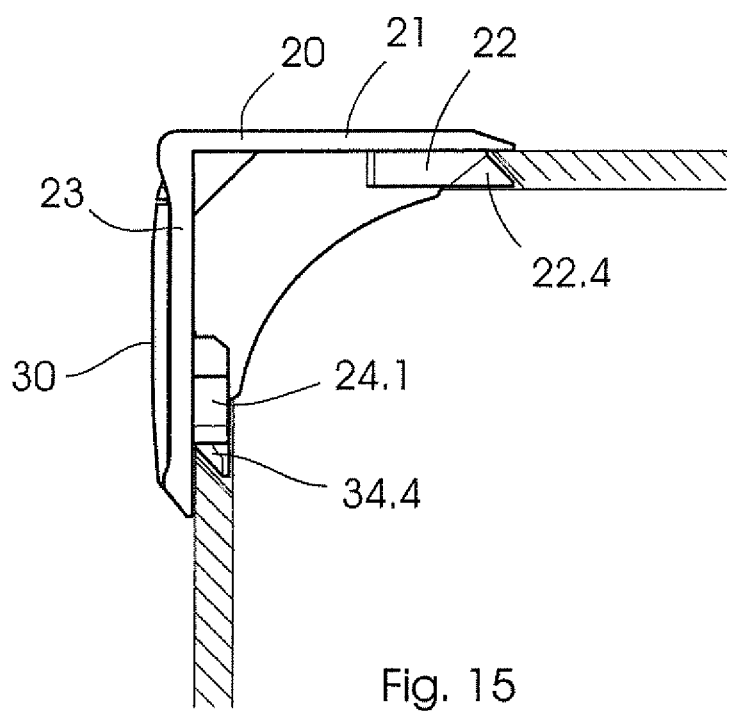
FIG. 15 shows the clip and panel combination of FIG. 13, with the locking arm in a locked position.

The sequence of installing a clip is now described with reference to FIGS. 10 to 15. In FIG. 10 two panels 11 have been located at a right angle relative to one another, and has been configured in order for the securing apertures 12, as well as the slots 13 extending therefrom, to be aligned. In FIG. 10, the first engagement formation 22 of the clip is being positioned in one of the securing apertures. This is done by positioning the clip, and in particular the first leg 21, at an angle relative to the panel 11 in order for the lateral extension 22.4 to protrude into the securing aperture 12. When the clip is now rotated relative to the panels 11 (shown in FIGS. 11 and 12), the lateral extension will slide into the tapering recess 12.2 of the securing aperture 12, and the end of the lateral extension 22.4 will therefore become trapped in the tapered recess 12.2 of the securing aperture. Further displacement of the clip 10 (shown in FIGS. 13 to 15) will then result in the cylindrical body 22.1 of the first engagement formation 22 to engage the securing aperture 12, and at the same time the gusset 25 will slide into the slot 13 provided in the panel 11, until the first leg 21 is flush, or substantially parallel, with the panel 11. At this point, the locking arm 30 will be moved to a release position as seen in FIGS. 12 and 13, in order for the displaceable section 34 of the second engagement formation 24 to be spaced apart from: the second leg 23 of the clip 10. This will enable the opposing protrusions 24.1 that define the stationary section of the second engagement formation 24 to be inserted into the cylindrical hole 12.1 of the securing aperture 12. At this point the geometry of the clip 10 will therefore prevent the clip from being laterally displaced from either of the panels 11, but it will still be possible to remove the club by rotating the clip relative to the panels 11. The locking arm 30 is subsequently displaced to the locked position as is shown in FIGS. 14 and 15, and the lateral extension 34.4 of the displaceable section 34 is pivoted into the tapered recess 12.2 of the securing aperture 12. At the same time the connecting zone 34.3 of the displaceable section 34 will move into the gap 24.3 provided between the opposing protrusions 24.1, whilst the cylindrical body 34.1 will move into a position adjacent the opposing protrusions 24.1, so as to define a composite cylindrical body. At the same time, the slot 34.6 will fit over the gusset 25 that extends across the opening 24.4 provided in the second leg 23. Finally, the hook formation 33 will engage the catch formation 27.1, and the locking arm 30 will be secured end to the locked position, shown in FIG. 15, with both engagement formations (22 and 24) snugly and securely engaging the securing apertures 12. The lateral extensions (22.4 and 34.4) will improve the grip of the clip then and will prevent the clip 10 from being removed, even if there is limited movement between the two panels 11.

Figure 16:
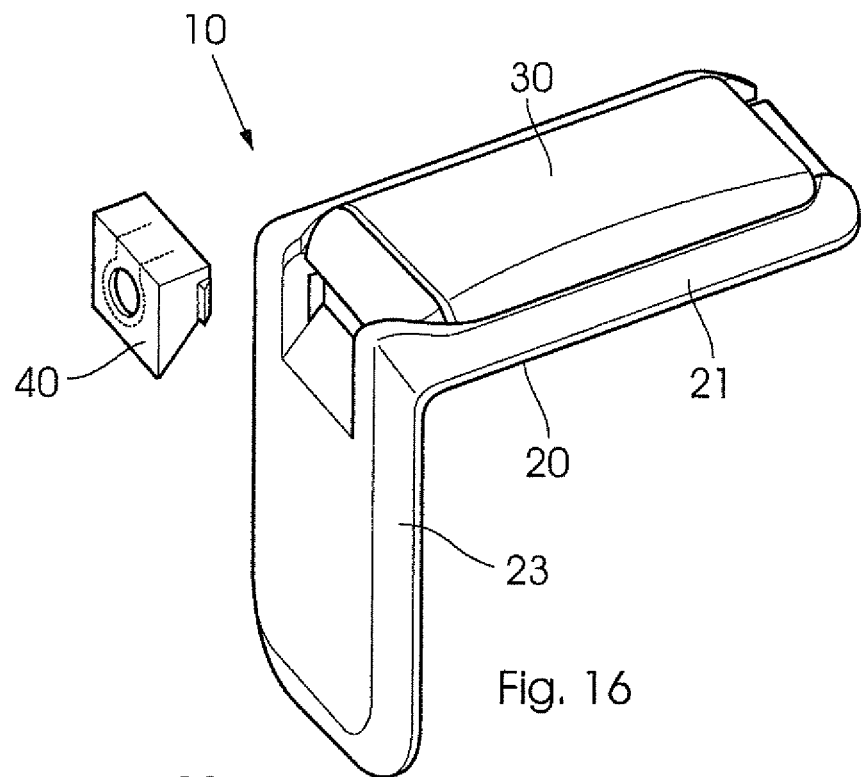
FIG. 16 is a perspective view of the clip in accordance with one embodiment of the invention, prior to the installation of a tamperproof locking member.
Figure 17:
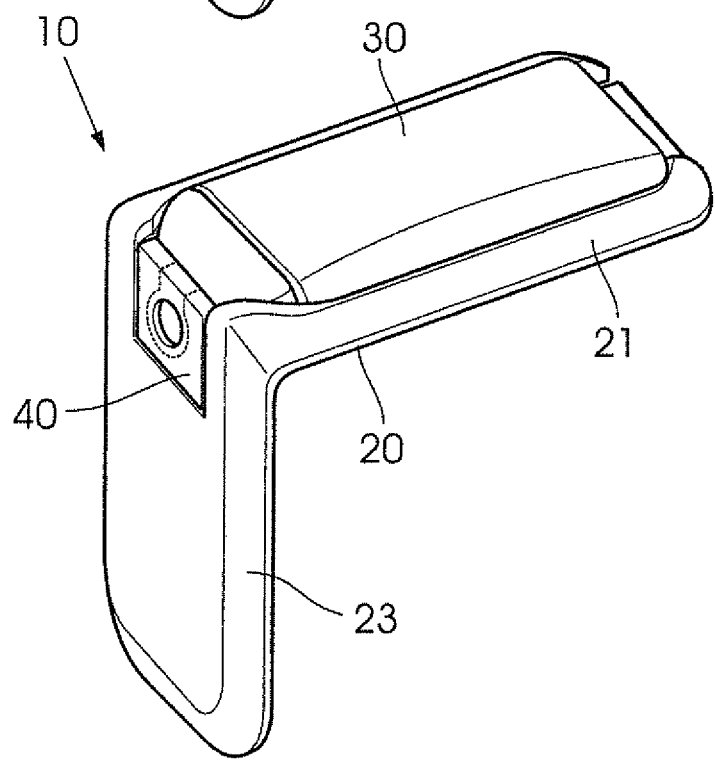
FIG. 17 shows the clip of FIG. 16 with the tamperproof locking member having been secured to the clip so as to prevent the locking arm from being displaceable without the removal of the tamperproof locking member.

Once the clip then has been installed, the tamper proof locking member 40 can be secured to the corner zone 27 as is shown in FIGS. 16 and 17, and will lock the formation 33, and hence the locking arm 30 in its locked position.

The inventor foresees that the use of the clip will by no means be limited to the field of collapsible containers. The clip can be used with any application where there is a need to secure panels to one another, for example furniture, partitioning and other knock-down building structures.

It will be appreciated that the above is only one embodiment of the invention and that there may be many variations without departing from the spirit and/or the scope of the invention.

The invention claimed is:

1. A releasable clip, suitable for securing two panels of a knock-down structure to one another, the releasable clip including:
   two legs extending away from one another,
   the legs being connected at one end, with each leg having an opposite free end that terminates in a panel engagement formation;
   wherein at least one of the panel engagement formations is an adjustable engagement formation that is adjustable between a locked position, in which the engagement formation is configured to engage a securing aperture provided in a panel, and a release position, in which the engagement formation is adapted to be released from the securing aperture;
   wherein the adjustable engagement formation includes a displaceable section, which is displaceable relative to the leg with which it is associated; and
   wherein the displaceable section of the adjustable engagement formation includes a primary body configured and dimensioned to fit inside the securing aperture in the panel to be secured, and a lateral extension extending sideways from the body, the lateral extension being configured and dimensioned suitable for, in use, engaging the panel.

2. The releasable clip of claim 1, wherein the adjustable engagement formation includes a stationary section which is stationary relative to the leg with which it is associated.

3. The releasable clip of claim 2, wherein the stationary section is spaced apart from the displaceable section when the engagement formation is in the release position, and wherein the stationary section and the displaceable section are juxtaposed when the engagement formation is in a locked position.

4. The releasable clip of claim 3, wherein the stationary section and the displaceable section are complementary configured in order to fit into one another so as to form an interlocked engagement formation when the displaceable section is in the locked position.

5. The releasable clip of claim 4, wherein the stationary section protrudes from the leg with which it is associated.

6. The releasable clip of claim 2, wherein the stationary section of the adjustable engagement formation is in the form of two spaced apart protrusions, with a gap being formed between the two spaced apart protrusions.

7. The releasable clip of claim 6, wherein the lateral extension, when the adjustable engagement formation is in the locked position, extends beyond a periphery of the protrusions defining the stationary engagement formation.

8. The releasable clip of claim 1, wherein the displaceable section extends from a locking arm, with the locking arm being displaceable relative to the leg.

9. The releasable clip of claim 8, wherein the locking arm is hingedly connected to the leg, and wherein the locking arm is hingedly displaceable between
   an open position, in which the arm is spaced apart from the leg, and in which the displaceable section of the engagement formation is spaced apart from the stationary section of the engagement formation; and
   a locked position, in which the arm overlies the leg, and in which the displaceable section of the engagement formation cooperates with the stationary section of the engagement formation so as to form an interlocked, composite engagement formation that is configured and dimensioned to engage the aperture provided in the panel to be secured.

10. The releasable clip of claim 9, wherein the locking arm is releasably lockable in the locked position.

11. The releasable clip of claim 10, wherein the arm is releasably lockable in the locked position by way of a resilient hook and catch configuration.

12. The releasable clip of claim 1, wherein the lateral extension is of tapered configuration.

13. The releasable clip of claim 12, wherein the lateral extension is substantially triangular when viewed in cross-section, with a base of the lateral extension being co-planar with a base of the body of the displaceable section.

14. The releasable clip of claim 1, wherein the lateral extension is configured and dimensioned for, in use, engaging a retaining recess of the securing aperture in the panel.

15. The releasable clip of claim 14, wherein the lateral extension is substantially triangular when viewed in cross-section, with a base of the lateral extension being co-planar with a base of the body of the displaceable section.

16. A method of assembling a knock-down structure, the method including the steps of:
   providing at least two panels located adjacent one another, each panel comprising a securing aperture provided in an edge zone thereof, and a slot that extends from the aperture to an edge of the panel;
   providing a clip comprising two legs extending away from one another, the legs being connected at one end, with each leg having a free end that terminates in a panel engagement formation; wherein at least one of the engagement formations is an adjustable engagement formation that is adjustable between a locked position, in which the engagement formation is adapted to engage the securing aperture provided in a panel, and a release position, in which the engagement formation is released from the securing aperture;

locating a fixed engagement formation of the clip into a securing aperture of one of the panels;

locating the adjustable engagement formation of the clip into a securing aperture of an adjacent panel while the adjustable engagement formation is in a release position; and pivotably displacing the adjustable engagement formation from the release position to the locked position in order for a lateral extension of a displaceable section of the adjustable engagement formation to be pivoted into the securing aperture in order to secure the clip to the panels.

* * * * *